March 5, 1968 J. L. MUENCH, SR 3,371,913
MIXER
Filed Feb. 14, 1967
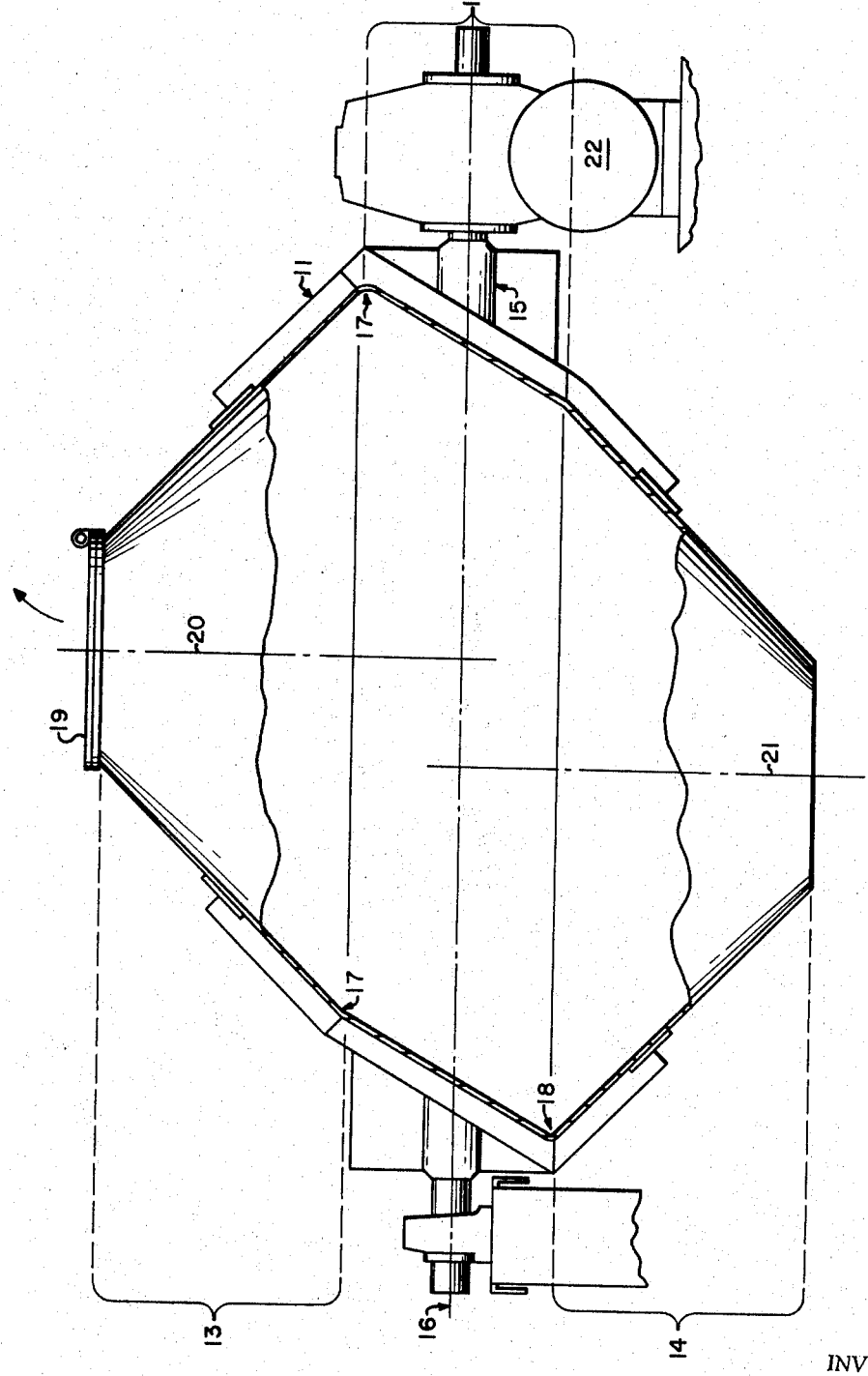
INVENTOR.
JOHN L. MUENCH, SR.
BY
Popper, Bain + Bobis
ATTORNEYS 3,371,913
MIXER
John L. Muench, Sr., 8 Chestnut Place,
Short Hills, N.J. 07078
Filed Feb. 14, 1967, Ser. No. 615,981
6 Claims. (Cl. 259—81)

ABSTRACT OF THE DISCLOSURE

A mixer having a generally tubular middle section of its mixing chamber in non-perpendicular intersection with the horizontal axis of rotation of the mixing chamber.

---

The invention relates generally to food machinery and particularly to mixers. Mixers are ordinarily made with a mixing chamber disposed symmetrically above and below the axis of rotation of a mixing chamber. It has been found that soft, moist, or tacky materials deposited in the mixer display a tendency to adhere to the inside walls of the mixing chamber in the general area of the axis of rotation where centrifugal force is weakest. Thus, while mixing the great mass of material deposited in the mixing chamber may result in a completely homogeneous mixture, certain portions will adhere to the middle section of the mixer in close proximity to the axis of rotation and will not blend with the greater mass of material mixed. This sometimes requires that this unmixed portion be scraped from the middle section of the mixing chamber and discarded. At other times, in the interest of complete homogeneity, and economy, the mixing chamber is stopped and the adherent material scraped from the middle section and deposited with the mass of material so that it may properly mix in a subsequent mixing operation. On other occasions, the lack of homogeneity is disregarded and the mixture is discharged. When such a mixture is used, a product lacking in the desired homogeneous texture is the result.

In the manufacture of bakery products, the commercial acceptance of such products is drastically reduced. It has been found that a mixing chamber may be designed having a generally tubular middle section, the wall of which is not disposed in the conventional manner in perpendicularity with the horizontal axis of rotation of the mixing chamber, but rather offset therefrom and disposed in non-perpendicular intersection with a plane perpendicular to the horizontal axis of rotation of the mixing chamber. With such a construction, the centrifugal force of rotation of the mixing chamber tends to minimize the adherence of materials to the wall of the mixing chamber in the general area of the axis of rotation. The material is impelled during rotation toward the central vertical axis of the mixing chamber where it blends more effectively with the mass of materials to be mixed, ultimately producing a truly homogeneous mass without any substantial adherence of material to a middle wall of the mixing chamber.

In the drawing, the sole figure is a vertical, partially-sectioned view of a mixing chamber mounted on trunnions for rotation.

Referring now to the drawings in detail, the mixer 11, illustrative of the invention, is divided into the sections. There is a middle section 12, a top section 13, and a bottom section 14. The top section 13 is a generally truncated cone. The bottom section 14 is also a generally truncated cone. The top section 13 and the bottom section 14 are generally equal. The middle section 12 of the mixing chamber is mounted for rotation on a pair of trunnions. The middle section 12 is tubular or hollow, and preferably is cylindrical in form, although it may be octagonal, hexagonal, rectangular, or have any other hollow shape. The axis of rotation 16 is preferably horizontal. The middle section is not perpendicular to the axis of rotation. The axis of rotation 16 preferably, though not necessarily, bisects the middle section 12.

In the preferred embodiment of the invention, a typical angular disposition of the middle section 12 with the axis 16 which is preferred, is shown. This angular disposition of the middle section 12 with respect to the horizontal axis of rotation 16 may be generally approximately 55°. The angle may be somewhat less or somewhat more, but the device operates with considerable efficiency when the wall of the middle section 12 is disposed in this manner.

The top edge of the middle top edge 17 and the bottom edge 18 are approximately equidistant from the axis of rotation 16, measured perpendicularly to the axis of rotation. Attached to the top edge 17 of the middle section is the top section 13. Attached to the bottom edge 18 of the middle section 12 is the bottom section 14. A hinged loading port 19 is provided although any other method of loading the mixer 11 may be utilized. Both the top section and the middle section are of truncated conical form. The central axis 20 of the top 13 is offset from the central axis 21 of the bottom 14. A motor 22 drives one of the trunnions 15 to rotate the chamber. The axes 20, 21 of the top and bottom sections 13, 14 are generally parallel to each other and vertical when the mixing chamber is in normal position. This construction provides a middle section 12 of the mixer 11 which is offset from perpendicularity with the axis of rotation 16 of the chamber 11 and extends above and below at an equal distance to the points where it is connected to the top and bottom sections. Since the middle section 12 has a wall diverging upwardly above the axis of rotation 16 at an acute angle at one side and an obtuse angle at the other side, moist, tacky material will not tend to cling to the inside wall of the middle section 12, but will tend to be moved centrifugally away from the axis of rotation until the material falls generally into the central area of the mixing chamber where it is incorporated in the tumbling mass and ultimately homogenized therewith.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued therein.

What is claimed is:
1. A mixer comprising
   (a) means to support a mixing chamber for rotation on a generally horizontal axis,
   (b) a mixing chamber,
   (c) a middle section of the chamber,
   (d) the middle section attached to the said means,
   (e) the middle section offset from perpendicular intersection with the axis of rotation,
   (f) top and bottom sections attached to the middle sections,
   (g) means for introducing material into the chamber,
   (h) means for rotating the chamber,
   (i) the top and bottom sections both having their largest cross-sectional area at the points of attachment to the middle section.
2. A mixing chamber according to the claim 1 in which the middle section is generally tubular.

3. A mixing chamber according to claim 2 in which the generally tubular middle section is cylindrical.

4. A mixing chamber according to claim 1 in which the top and bottom sections are generally truncated cones.

5. A mixing chamber according to claim 1 in which the axes of the top and bottom sections are generally parallel to each other.

6. A mixing chamber according to claim 1 in which the middle section is offset from perpendicularity with the axis of rotation and extends above and below it an equal distance to the points where section connects to the top and bottom sections.

References Cited

UNITED STATES PATENTS 2,288,440   6/1942   Evans _____ 259—81
3,218,041  11/1965   Kubodera _____ 259—81

ROBERT W. JENKINS, *Primary Examiner.*